May 27, 1930.                H. SCHULTZ                1,760,010
         CASTING MOLD FOR ALUMINO THERMIC WELDING
                      Filed Feb. 18, 1928

INVENTOR
Hermann Schultz
BY
HIS ATTORNEY

Patented May 27, 1930

1,760,010

UNITED STATES PATENT OFFICE

HERMANN SCHULTZ, OF LANKWITZ, NEAR BERLIN, GERMANY

CASTING MOLD FOR ALUMINO-THERMIC WELDING

Application filed February 18, 1928, Serial No. 257,117, and in Germany April 6, 1927.

The invention relates to a novel form of flask or box and mold for alumino-thermic and similar welding operations, which involve enclosing the ends of the parts to be welded in a mold and pouring superheated metal into the mold to effect a welded joint or union between the sections.

Heretofore it has been customary to construct the flasks or mold boxes for such operations of rectangular form to receive a pattern about which the molding sand was rammed to constitute the refractory lining for the mold and also to define the molding cavity surrounding the parts to be welded, which latter are substituted for the pattern after the mold has been completed. This practice involves the use of comparatively large quantities of expensive refractory sand and the refractory walls of the sand are of varying and irregular thickness, so that it is frequently found difficult to completely dry the mold forming medium preparatory to effecting the welding operation, even when the usual pre-heating of the sections to be welded by means of a gas flame or other medium, is employed. It is quite essential that the mold forming material be thoroughly dried, as the presence of moisture even in small quantities is liable to cause explosions and, in any event, would be productive of unsatisfactory welds. Because of these conditions under the old practice, it is quite usual to build or construct molds at places where a thorough drying of the refractory material may be effected and then transport the molds to the site of the welding operations. This is expensive and time consuming and not infrequently involves damage to the mold in transit.

The present invention is designed to overcome all of these difficulties and to provide a method of forming the molds at the place of use with the assurance that the refractory mold forming material will be thoroughly dried by the ordinary preheating operations and, at the same time, involve a material saving in the amount of the refractory sand or similar material employed in forming the molds. To this end, the invention comprises the construction of the flask or mold box having an interior shape or configuration substantially corresponding to and somewhat larger than the parts to be welded, whereby the mold forming medium, such as sand, when rammed into the flask or box about the pattern, will have walls of substantially uniform thickness and which will therefore dry out uniformly under the action of the preheating medium and will also involve a material saving in sand or other mold forming material.

The invention is illustrated in the accompanying drawings, in which:—

Figure 1:
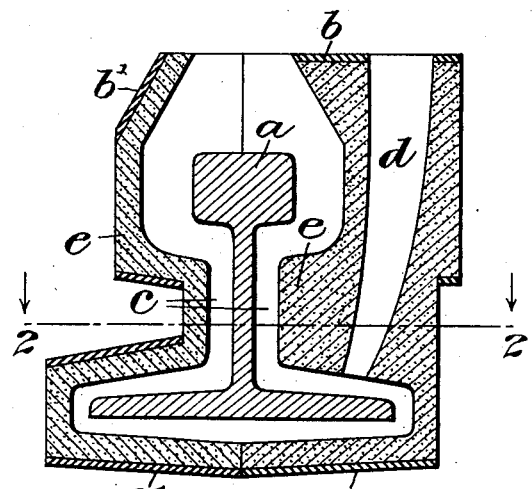
Fig. 1 is a vertical sectional elevation, more or less in diagram, of a typical mold, involving the invention, for alumino-thermic welding the ends of railway rails together.
Figure 2:
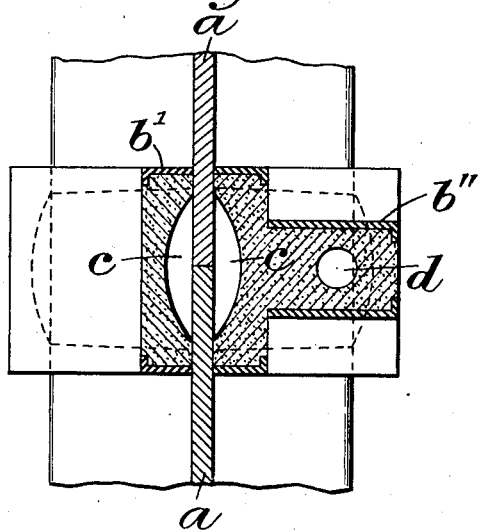
Fig. 2 is a horizontal section on the line 2—2 of Fig. 1.

Referring to the drawings, $a$ indicates the rails to be welded, the ends of which are enclosed within the mold, as is usual. $b$, $b'$ indicate the half sections of the flask or mold box, which is preferably constructed in shape or configuration to substantially conform to the cross sectional contour of the pattern, as shown, with the lateral section $b''$ offset at one side of one of the flask sections to provide a section in which the pouring gate $d$ is located. The respective flask sections are constructed sufficiently larger than the cross sectional areas of the rails or other parts to be welded, so as to provide a space outside of the pattern upon which the mold proper is formed, that is of substantially uniform width, so that, when the molding sand is rammed into the flask about the enclosed pattern, the refractory sand walls $e$ of the mold will be of substantially uniform thickness in all that portion of the mold which receives and retains the superheated molten metal which is poured into the mold through the gate $d$, and these refractory walls may be made just thick enough to insure the durability of the mold during the casting operation.

After the mold has been thus formed, the pattern is removed and the completed mold is ready for application to the rail ends or other parts to be welded, the latter occupying the mold cavity $c$ defined by the pattern, in the relation indicated in the drawings, so that the superheated molten metal will completely surround the parts to be welded.

What I claim is:

1. A mold box for alumino-thermic welding railway rails and the like having an interior shape substantially corresponding to and somewhat larger than the pattern; whereby the mold forming medium will have walls of substantially uniform thickness.

2. A mold for alumino-thermic welding railway rails and the like comprising a box having walls substantially conforming in shape to the pattern, and a compacted body of mold forming medium having walls of substantially uniform thickness within the box and defining the mold cavity.

3. A mold of refractory material for alumino-thermic welding railway rails and the like having an exterior shape substantially corresponding to and somewhat larger than the mold cavity, whereby the walls will be of substantially uniform thickness.

In testimony whereof I affix my signature.

HERMANN SCHULTZ.